Patented June 6, 1939

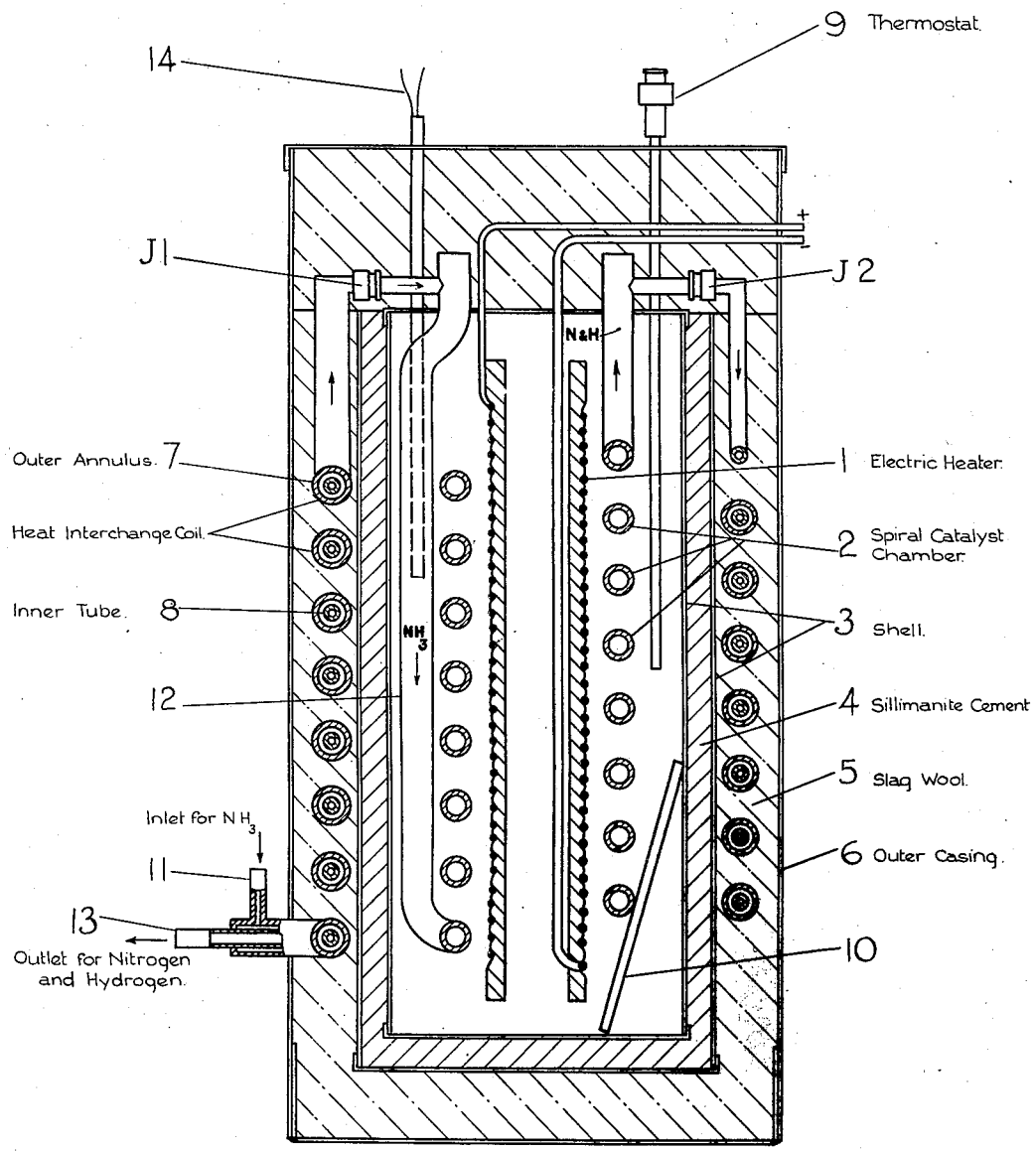

2,161,746

UNITED STATES PATENT OFFICE 2,161,746

APPARATUS FOR DECOMPOSING AMMONIA

John Lindon Pearson, Norton-on-Tees, England, assignor to Imperial Chemical Industries Limited, a corporation of Great Britain Application July 23, 1936, Serial No. 92,207
In Great Britain August 7, 1935

9 Claims. (Cl. 23—288)

This invention relates to the decomposition of ammonia to produce mixtures of hydrogen and nitrogen.

Ammonia is readily available at reasonably low prices and can be used economically for the production of hydrogen and nitrogen or mixtures of these two for many requirements, especially in the metallurgical industry.

The passage of gaseous ammonia over suitable catalysts at elevated temperatures results in ready decomposition of the gas, but numerous difficulties have been encountered in the use of known apparatus for this purpose.

Thus the apparatus must be compact and thermally efficient but excessive stresses set up by temperature differences, combined with the results of the attack of ammonia and of hydrogen on the metals commonly employed, especially where excessive temperatures are likely to occur, have caused mechanical failures to occur either frequently or prematurely with known apparatus. Further, the most vulnerable part has generally been the electric heater and the replacing or repairing of this necessitated dismantling many other parts of the apparatus besides the heater itself. In addition to the considerable amount of labour and delay in operation required for this, there was also the serious drawback that the catalyst in the apparatus was rendered less efficient or effective after being exposed to the air.

According to one previous proposal the heater was located so that after the ammonia had completed its passage through an annular catalyst chamber the decomposition products then passed in direct contact with the heater. This arrangement did not prove to be altogether suitable in practice owing to the difficulty of controlling the temperature in the catalyst bed. More uniform temperature distribution was obtained with the arrangement of a further proposal in which decomposition was effected in two stages, with a heater located between two catalyst beds, but in this arrangement it is difficult to attain the temperature range desirable throughout the catalyst mass, and it is difficult to arrange the heater so that the apparatus is commercially reliable. In both of these proposals the inspection or repair of the heater led to deterioration of the catalyst as a result of oxidation, since it was not possible to keep the air away from the catalyst.

The present invention has for its aim the provision of an improved method and apparatus for decomposing ammonia which also permits of ready accessibility to the catalyst chamber, the electric heater and the thermostatic control for the heater and rapid replacement of any one of these without dismantling other parts of the apparatus.

According to the present invention gaseous ammonia is decomposed by passing it first through a heat interchanger in which it obtains heat from the outgoing hydrogen and nitrogen and then through a chamber containing an ammonia decomposing catalyst, heat being supplied to the said chamber by radiation from an electric heater or heaters which surrounds and/or is surrounded by the chamber, the said heater or heaters being isolated at all points from the ammonia both before and after decomposition.

The heat receiving surfaces of the catalyst chamber and the heat radiating surfaces of the adjacent parts should be as great as possible in order to keep temperature differences low throughout the apparatus. The heat receivable by the catalyst chamber should not be more than about 2,380 B. t. u.'s per square foot per hour, and preferably not more than 1,785 B. t. u.'s per square foot per hour. Thus it is convenient to construct the catalyst chamber in the form of a coil from relatively thick walled tubing and of relatively small bore, e. g. of the order of 1", and to arrange the heater within the space enclosed by the coil. This arrangement gives maximum surface to the catalyst chamber and is a very convenient practical form to adopt. Alternatively, the catalyst chamber may be a relatively narrow annular vessel, e. g. one inch in width, which surrounds and/or is surrounded by a radiant electric heater.

A further feature of the invention consists in making the catalyst chamber in the form of a helical coil and in connecting this coil to a double coil interchanger in such a manner that the joints between the inner tube of the interchanger and the gas exit end of the catalyst coil, and between the outer tube of the interchanger and the gas inlet end of the catalyst coil, are located in a comparatively cool and accessible portion of the apparatus. Preferably the catalyst coil and the heater are mounted in a cylindrical space surrounded by one or more layers of insulating material in which the interchanger coil is embedded, the whole having insulating end covers, one of which has embedded in it the said joints, and preferably also the electrical leads, thermocouple and thermostat leads.

The invention permits of a simple and accessible apparatus from which any parts liable to require attention or renewal may be withdrawn without disturbing the rest of the apparatus and without necessitating the changing of the catalyst.

The invention further permits of a high thermal efficiency being obtained from the heater, the temperature distribution over the catalyst chamber is substantially uniform and no great temperature differences exist in any part of the apparatus.

One form of the apparatus embodying the invention is shown in the accompanying drawing which is a sectional elevation. In the centre of the apparatus there is an electrical heater 1 of the radiant heat type comprising a resistance wire wound on a refractory former, and around this and a short distance from it is the catalyst chamber 2 constructed as a vertical coil made from a known alloy steel containing approximately 18% chromium, 8% nickel, 0.5%–1% tungsten and 0.4%–0.8% titanium. Surrounding this coil there is a double shell 3, used as a former for inserting a sillimanite cement insulating lining 4, whilst between the outer wall of the shell and the outer casing 6 a heat insulating medium consisting of a slag wool 5, is provided. Embedded in the slag wool is a double wound coil 7, 8 which serves as the heat interchanger between the incoming ammonia and the outgoing decomposed gases. A further metal shell (not shown) which is slightly smaller in diameter than the shell 3, is inserted within it and its thickness is such that temperature differences over its surface are rendered small by conduction. The radiations from it to the catalyst chamber are thereby made more uniform, with a consequently greater uniformity in the temperature of the different coils of the catalyst chamber. The metal shell is preferably made in two hemi-cylindrical halves in order to facilitate insertion and withdrawal.

The thermostat 9 is of the known direct expansion type and is inserted between the catalyst chamber 2 and the inner metal wall of the shell 3. In this position the instrument is subjected to temperatures very nearly the same as the catalyst chamber 2, and as no protective sheath is required the instrument is quickly responsive to changes in temperature, and by controlling the electric current by known means regulates the temperature of the catalyst chamber.

In order to avoid oxidation of the outside walls of the catalyst chamber, several carbon rods 10 may be inserted between the coil 2 and the shell 3 so that an atmosphere high in carbon dioxide is preserved around the catalyst chamber, the heater, the thermostat and the wall of the shell.

Any catalyst which is active for the decomposition of ammonia may be employed, such for example as fused iron oxide granulated in admixture with small amounts of promoters such as aluminium oxide and magnesium oxide. Such catalysts are apt to crumble or disintegrate at the higher working temperatures, and they also tend to sinter at still higher temperatures, which may exist locally owing to the relatively poor thermal conductivity of the catalysts. It is therefore advantageous to assist the distribution of heat throughout the catalyst by inserting metallic filling material such as metal turnings, shot, nails, gauze or the like, either in the form of layers arranged alternately with layers of catalyst or distributed more or less uniformly throughout the mass of the catalyst. The arrangement should be such that no portion of the catalyst is more than say one-half to one inch away from a good heat conductor, which may either be the metallic filling material previously referred to or the metal walls or boundaries which contain the catalyst. In the case of sufficiently narrow catalyst beds the use of metallic filling material may be dispensed with.

The most desirable temperature to be maintained in the catalyst chamber varies with the catalyst employed but with the usual promoted iron oxide catalyst the best working range is 540° to 570° C. Below this range too much ammonia will be left in the decomposition gases unless very low space velocities are used whilst above this range the catalyst will have a relatively short life owing to crumbling and/or sintering.

In starting up the apparatus with a fresh batch of catalyst it is necessary to reduce the latter before it becomes fully active for the decomposition of ammonia. The reduction may be effected by switching on the heater and passing hydrogen, sulphur free coal gas or the like through the apparatus, or ammonia itself may perform the same function. It is necessary that the gas used for reduction should be free from catalyst poisons. The water formed during reduction drains from the tube 13.

In order to eliminate as far as possible nitriding of the inside walls of the catalyst chamber, steps are taken to ensure the retention of catalyst over and adjacent to the surfaces of the catalyst chamber, such surfaces being liable to be attacked by ammonia far more rapidly when no catalyst is present than when catalyst is present. Accordingly, a plug of steel turnings may be inserted in each turn of the coil, the turnings being inserted in the form of a ball tightly bound by thread (which, of course, is disintegrated or rapidly burnt when the apparatus is put into service) but as a result of the springiness and nitriding of the steel turnings they are bound together not only to each other but to a certain extent to the inside walls of the coil. These plugs serve to segregate the catalyst into a considerable number of portions so that general collapse or settling is not possible. Further, the gaseous ammonia is initially admitted into the cooler parts of the coil so that the hotter portions of the walls are not encountered by gases having a high ammonia content. The fact that the temperature of the coil at the lower end is below the working temperature of the major part of the coil also reduces the danger of nitriding.

A temperature alarm operated by a thermocouple 14 may be incorporated.

The apparatus is operated by raising and maintaining the temperature in the apparatus by means of the heater 1 and then passing gaseous ammonia through an inlet pipe 11 and the annulus 7 of the heat interchanger where it is heated by the gases passing through the inner coil 8 to a temperature approaching the reaction temperature. The gaseous ammonia next passes downwards through the tube 12 and enters the catalyst chamber 2 where it is decomposed by passage over the catalyst therein. On leaving the top of the catalyst chamber the hot gases consisting of a mixture of hydrogen and nitrogen pass into the inner tube 8 of the heat interchanger through which they pass and finally leave the apparatus by pipe 13.

An apparatus of the kind described above and designed to yield 2.5 cubic metres (88.28 cubic feet) per hour of hydrogen-nitrogen mixture required a 2.5 k. w. heater, which on the average was operative for about two-thirds of the time the apparatus was in use. The radiating surface of the heater was about 2 square feet and the space velocity of ammonia in the catalyst coil was about 500 reciprocal hours. The superficial area of the catalyst coil was about 5 square feet.

For commercial and reasonably priced apparatus producing the relatively small cracked gas rates demanded by most engineering and metallurgical applications, i. e. gas rates of approximately 1–10 cubic metres (35.31–353.14 cubic feet) per hour, and especially where varying gas rates and intermittent usage prevail, gas-tight high temperature joints (denoted by $J_1$ and $J_2$ in the drawing) in the apparatus should be a minimum in number and small in size.

I claim:—

1. An apparatus suitable for the thermal decomposition of ammonia and comprising a heat interchanger, a catalyst chamber through which ammonia and its decomposition products may flow, an electric heater, and a casing enclosing said heat interchanger, catalyst chamber and heater, said electric heater being arranged directly adjacent to and adapted to heat the catalyst chamber by direct radiation, the gas path being entirely closed with respect to the heater so that the latter is isolated at all points from the ammonia and its decomposition products and so that said heater may be inspected or replaced without allowing the air to come into contact with the catalyst.

2. An apparatus as claimed in claim 1, in which the catalyst chamber has walls of heat-conducting material arranged relatively close together so that no portion of the catalyst therein is more than about one-half to one inch away from a good conductor of heat.

3. An apparatus as claimed in claim 1, in which metallic filling materials are provided in the catalyst chamber in the form of layers arranged alternately with layers of catalyst.

4. An apparatus as claimed in claim 1, in which the catalyst chamber takes the form of a relatively thick walled tube of relatively small bore, said tube being wound in a coil and the electric heater being arranged within the space enclosed by the coil.

5. An apparatus as claimed in claim 1, in which the catalyst chamber takes the form of a relatively narrow annular vessel, electric heaters being provided external to the chamber and both within and outside the annulus.

6. An apparatus as claimed in claim 1, in which the catalyst chamber takes the form of a relatively thick walled tube of relatively small bore, said tube being wound in a coil and the electric heater being arranged within the space enclosed by said coil, and said interchanger takes the form of a double coil, said catalyst coil being connected to said double coil interchanger to provide joints between the inner tube of the interchanger and the gas exit end of the catalyst coil and between the outer tube of the interchanger and the gas inlet end of the catalyst coil, said joints being located in a comparatively cool and accessible portion of the apparatus.

7. An apparatus as claimed in claim 1, in which the catalyst chamber takes the form of a relatively thick walled tube of relatively small bore, said tube being wound in a coil and the electric heater being arranged within the space enclosed by said coil, and said interchanger takes the form of a double coil, said catalyst coil being connected to said double coil interchanger to provide joints between the inner tube of the interchanger and the gas exit end of the catalyst coil and between the outer tube of the interchanger and the gas inlet end of the catalyst coil, and said catalyst coil and said heater being mounted in a cylindrical space surrounded by at least one layer of insulating material in which the interchanger coil is embedded, the whole having insulating end covers, one of which has embedded in it the said joints.

8. An apparatus as claimed in claim 1, in which metallic filling materials are provided in said catalyst chamber, said materials being distributed uniformly throughout the mass of the catalyst.

9. Apparatus suitable for the thermal decomposition of ammonia comprising a catalyst chamber through which ammonia and its decomposition products may flow, means for heating the catalyst chamber by radiation, and a casing enclosing said catalyst chamber and said heating means, said heating means being arranged directly adjacent to and adapted to heat said catalyst chamber by direct radiation, the gas path being entirely closed with respect to the heating means so that the latter is isolated at all points from the ammonia and its decomposition products and so that said heating means may be inspected or replaced without allowing the air to come into contact with the catalyst.

JOHN LINDON PEARSON.